US012676435B2

(12) United States Patent
Raybold et al.

(10) Patent No.: US 12,676,435 B2
(45) Date of Patent: Jul. 7, 2026

(54) SPRING CLIP AND CONNECTOR FOR A FLAT FLEXIBLE CABLE

(71) Applicant: TE Connectivity Solutions GmbH, Schaffhausen (CH)

(72) Inventors: Christopher Raybold, Middletown, PA (US); John Mark Myer, Middletown, PA (US); RYan David Hetrick, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 533 days.

(21) Appl. No.: 17/880,296

(22) Filed: Aug. 3, 2022

(65) Prior Publication Data

US 2023/0056567 A1 Feb. 23, 2023

Related U.S. Application Data

(60) Provisional application No. 63/235,354, filed on Aug. 20, 2021.

(51) Int. Cl.
*H01R 12/77* (2011.01)
*H01R 4/2404* (2018.01)

(52) U.S. Cl.
CPC ......... *H01R 12/774* (2013.01); *H01R 4/2404* (2013.01)

(58) Field of Classification Search
CPC .. H01R 12/744; H01R 4/2404; H01R 12/774; H01R 12/59–69; H01R 13/432; H01R 13/2442; H01R 13/11; H05K 3/326
USPC ......................... 439/391, 422, 877, 492, 888
See application file for complete search history.

(56) References Cited

U.S. PATENT DOCUMENTS

| | | | | |
|---|---|---|---|---|
| 4,945,192 A * | 7/1990 | Urushibata | H01R 12/63 | 439/867 |
| 5,299,954 A | 4/1994 | Ishii | | |
| 6,099,366 A | 8/2000 | Shinchi | | |
| 6,305,968 B1 | 10/2001 | Hio et al. | | |
| 6,439,921 B1 * | 8/2002 | Hio | H01R 12/68 | 439/422 |
| 6,666,706 B1 * | 12/2003 | Jones | H01R 12/675 | 439/353 |
| 2005/0245136 A1 * | 11/2005 | Yin | H01R 13/2442 | 439/630 |
| 2013/0109212 A1 * | 5/2013 | Ohyama | H01R 13/5221 | 439/272 |
| 2022/0407258 A1 * | 12/2022 | Racho | H01R 13/2442 | |

OTHER PUBLICATIONS

International Search Report, International App. No PCT/IB2022/057837 International Filing Date Aug. 22, 2022.

* cited by examiner

*Primary Examiner* — Christopher M Koehler
*Assistant Examiner* — Gregory L Mangot

(57) ABSTRACT

A spring clip has a first beam and a second beam connected to the first beam. The second beam is resiliently deflectable toward the first beam from a relaxed position distal from the first beam to a compressed position proximal to the first beam. The second beam has a spring latch disposed at an end of the second beam and extending toward the first beam. The spring latch engages the first beam to secure the second beam in the compressed position.

18 Claims, 12 Drawing Sheets

SPRING CLIP AND CONNECTOR FOR A FLAT FLEXIBLE CABLE

CROSS-REFERENCE TO RELATED APPLICATION

This application claims priority under 35 U.S.C. § 119 to U.S. Provisional Patent Application No. 63/235,354, filed on Aug. 20, 2021.

FIELD OF THE INVENTION

The present invention relates to a connector and, more particularly, to a connector having a spring clip for connection to a flat flexible cable.

BACKGROUND

Flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to round wire-based architectures. As a result, FFCs are being considered for many complex and/or high-volume applications, including wiring harnesses, such as those used in automotive manufacturing.

The implementation or integration of FFCs into existing wiring environments is not without significant challenges. In an automotive application, by way of example only, an FFC-based wiring harness would be required to mate with perhaps hundreds of existing components, including sub-harnesses and various electronic devices (e.g., lights, sensors, etc.), each having established, and in some cases standardized, connector or interface types. Accordingly, a critical obstacle preventing the implementation of FFCs into these applications includes the need to develop quick, robust, and low resistance termination techniques which enable an FFC to be connectorized for mating with these existing connections.

Current FFC terminals include piercing-style crimp terminals, wherein sharpened tines of a terminal are used to pierce the insulation of the FFC in order to attempt to establish a secure electrical connection with the embedded conductor. In harsh environmental conditions, however, such a connection suffers from plastic creep and stress relaxation over time, failing to reliably maintain the electrical connection between the terminal and the conductor.

SUMMARY

A spring clip has a first beam and a second beam connected to the first beam. The second beam is resiliently deflectable toward the first beam from a relaxed position distal from the first beam to a compressed position proximal to the first beam. The second beam has a spring latch disposed at an end of the second beam and extending toward the first beam. The spring latch engages the first beam to secure the second beam in the compressed position.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
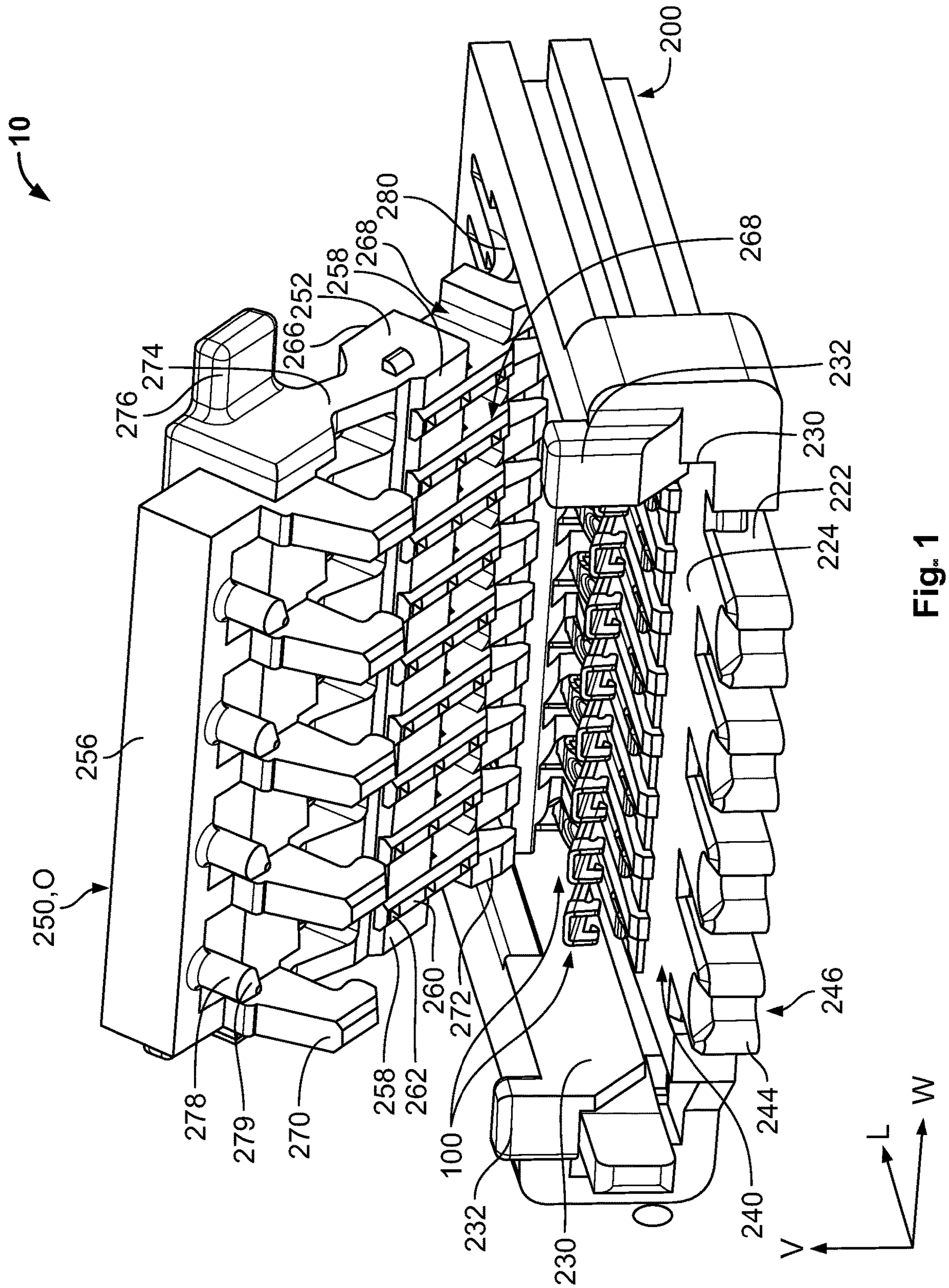
FIG. 1 is a perspective view of a connector according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as "longitudinal", "width", and "vertical". These descriptors are merely for clarity of the description and for differentiation of the various directions. These directional descriptors do imply or require any particular orientation of the disclosed elements.

Throughout the drawings, only one of a plurality of identical elements may be labeled in a figure for clarity of the drawings, but the detailed description of the element herein applies equally to each of the identically appearing elements in the figure.

A connector 10 according to an embodiment is shown in FIG. 1. The connector 10 comprises a plurality of spring clips 100 and a housing 200 in which the plurality of spring clips 100 are disposed. As shown in FIGS. 4, 7, and 9-11, the connector 10 can be connected to a flat flexible cable (FFC) 20 to form a connector assembly 1. One of the spring clips 100 will be referenced and described in detail in the following description, but the description applies equally to each of the spring clips 100 of the connector 10 and the connector assembly 1.

Figure 2:
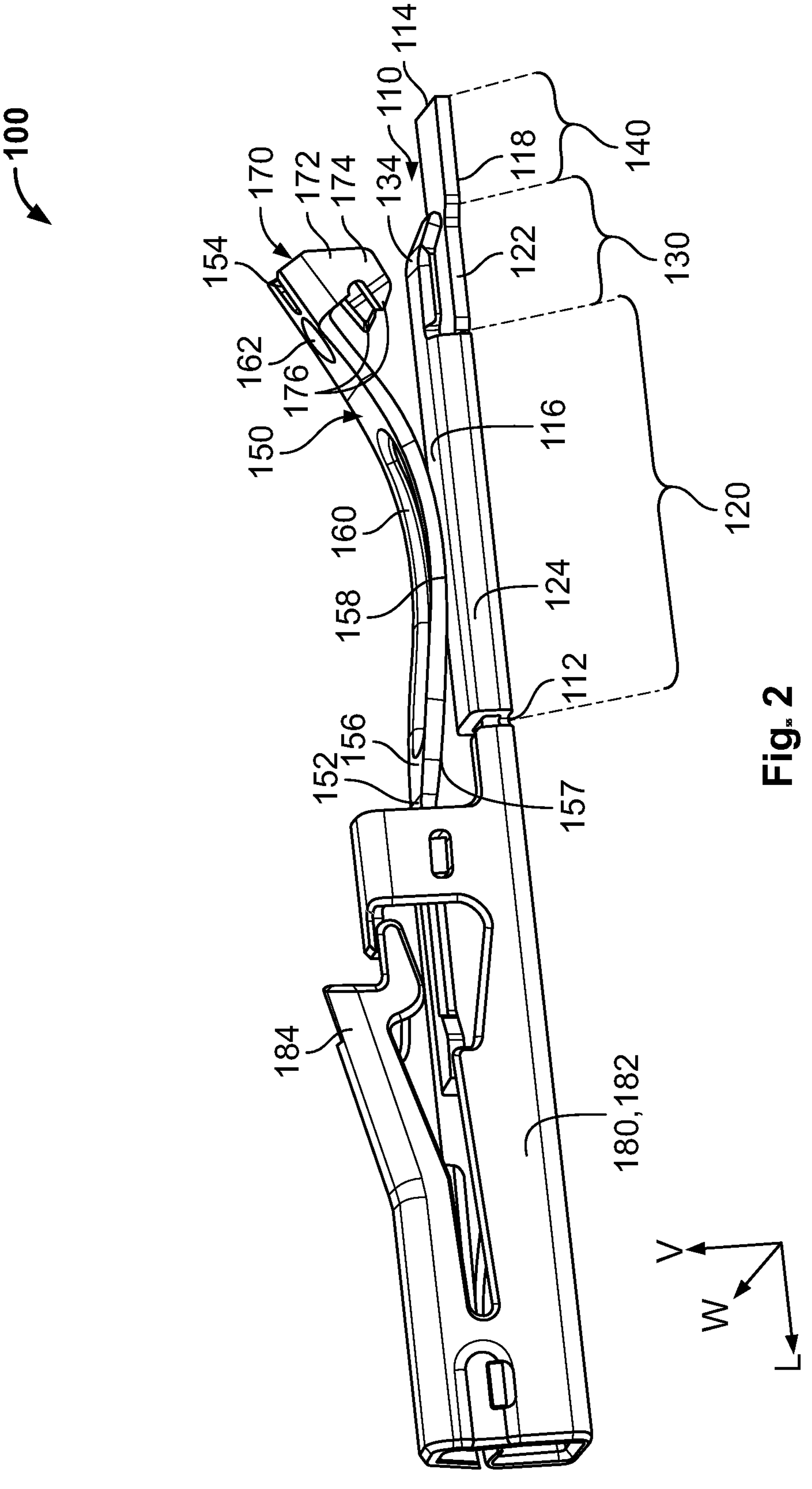
FIG. 2 is a perspective view of a spring clip of the connector.
Figure 3:
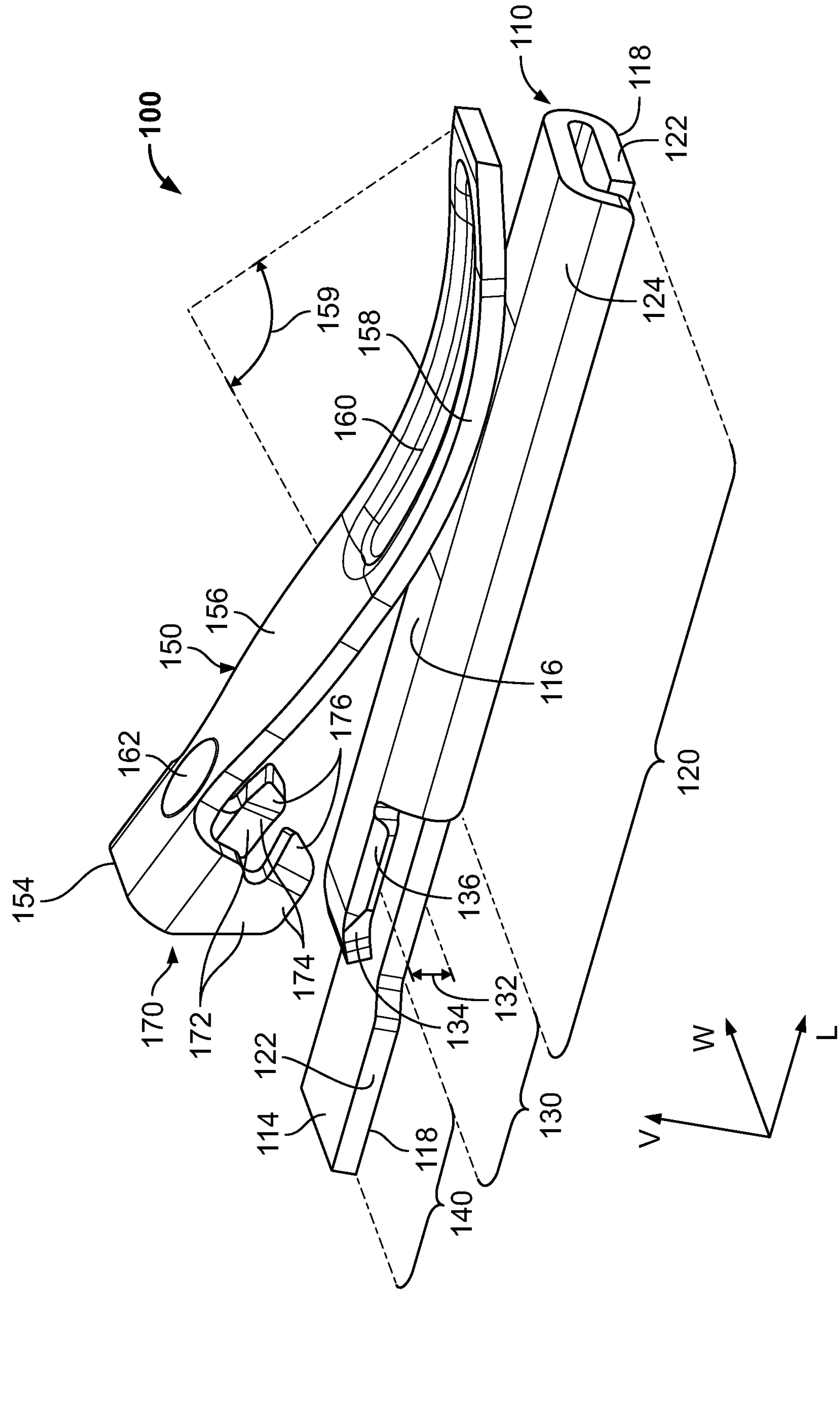
FIG. 3 is a sectional perspective view of the spring clip.

The spring clip 100, as shown in FIGS. 2 and 3, has a first beam 110 and a second beam 150 each connected to and extending from a connection section 180. The spring clip 100 is formed of a conductive material, such as copper or aluminum. In an embodiment, the first beam 110, the second beam 150, and the connection section 180 are monolithically formed in a single piece from the conductive material. The second beam 150 is resiliently deflectable toward the first beam 110.

The first beam 110, as shown in FIG. 2, extends from a first end 112 connected to the connection section 180 to a second end 114 opposite the first end 112 in a longitudinal direction L. The first beam 110 has a contact section 120 extending from the first end 112, a latch section 130 extending from the contact section 120, and an end section 140 extending from the latch section 130. The first beam 110, as shown in FIGS. 2 and 3, has a base beam 122 extending from the first end 112 to the second end 114 and forming a bottom surface 118 of the first beam 110 in a vertical direction V perpendicular to the longitudinal direction L. In the embodiment shown in FIGS. 2 and 3, the bottom surface 118 formed by the base beam 122 is a planar surface.

As shown in FIGS. 2 and 3, the contact section 120 of the first beam 110 has a folded structure 124 that extends from the base beam 122 and is folded over the base beam 122. The folded structure 124 forms a contact surface 116 in the contact section 120 facing the second beam 150. In the shown embodiment, the folded structure 124 is formed in a single piece with the base beam 122, for example by stamping, and is then bent into the shape of the folded structure 124 shown in FIGS. 2 and 3. As shown in FIG. 3, in an embodiment, a portion of the folded structure 124 forming the contact surface 116 is separated from the base beam 122 in the vertical direction V.

In the latch section 130, as shown in FIGS. 2 and 3, a folded extension 134 extends from the folded structure 124 in the longitudinal direction L over the base beam 122. In the shown embodiment, the folded extension 134 is monolithically formed in a single piece with the folded structure 124. The folded extension 134 is positioned above the base beam 122 in the vertical direction V. The folded extension 134 is separated from the base beam 122 in the vertical direction V where it is joined with the folded structure 124 and, in the shown embodiment, is bent toward the base beam 122 at an end of the folded extension 134 opposite the folded structure 124.

As shown in FIG. 3, the folded extension 134 has a sloped surface 136 on opposite sides of the folded extension 134 in a width direction W perpendicular to the longitudinal direction L and the vertical direction V. The sloped surface 136 faces the second beam 150 and slopes outward from a center of the folded extension 134 in the width direction W. A bottom of the sloped surface 136, and a bottom of the folded extension 134 in a region of the sloped surface 136, is positioned at a latch height 132 above the bottom surface 118 of the base beam 122 in the vertical direction V. In the shown embodiment, the folded extension 134 at the sloped surface 136 is wider than the base beam 122 in the width direction W.

In the embodiment shown in FIGS. 2 and 3, only the base beam 122 of the first beam 110 extends in the end section 140. The base beam 122 continues the planar bottom surface 118 in the end section 140 and, in the shown embodiment, is wider in the width direction W in the end section 140 than in the latch section 130.

The second beam 150, as shown in FIG. 2, extends from a first end 152 to an opposite second end 154 along the longitudinal direction L. The second beam 150 has an exterior surface 156 and an interior surface 157 opposite the exterior surface 156 in the vertical direction V. The interior surface 157 faces the first beam 110. The second beam 150 has a contact bend 158 extending toward the first beam 110 between the first end 152 and the second end 154. The contact bend 158 is aligned with the contact surface 116 of the first beam 110 in the vertical direction V. As shown in FIG. 3, the contact bend 158 has a radius of curvature 159. In the embodiment shown in FIG. 2, the second beam 150 has a bend embossment 160 extending along the second beam 150 in the contact bend 158.

As shown in FIGS. 2 and 3, the second beam 150 has a spring latch 170 disposed at the second end 154 and extending toward the first beam 110. The spring latch 170 has a pair of latch arms 172 extending from opposite sides of the second beam 150 in the width direction W. Each of the latch arms 172 extends in the vertical direction V toward the first beam 110 and has a sharp free end 174 opposite the second beam 150. In the shown embodiment, each of the latch arms 172 is formed in an L-shape and has a latch tip 176 angled toward the opposite one of the latch arms 172. As shown in the embodiment of FIGS. 2 and 3, the spring latch 170 is monolithically formed in a single piece with the second beam 150 and, in an embodiment, with the entirety of the spring clip 100.

In the embodiment shown in FIGS. 2 and 3, the second beam 150 has a bead 162 disposed on the exterior surface 156 and protruding from the exterior surface 156. The bead 162, in the shown embodiment, is adjacent to the spring latch 170 at the second end 154.

The connection section 180, in the embodiment shown in FIG. 2, has a pin interface 182 connecting the first beam 110 and the second beam 150. In the shown embodiment, the pin interface 182 is a box and spring interface adapted to resiliently abut and electrically connect to a contact pin. In other embodiments, the pin interface 182 may be any type of interface adapted to electrically connect to a contact pin that is connected to the first beam 110 and the second beam 150 and permits resilient deflection of the second beam 150 toward the first beam 110. The connection section 180 has a clip latch 184 protruding in the vertical direction V. The clip latch 184 is resiliently deflectable toward the connection section 180.

Figure 4:
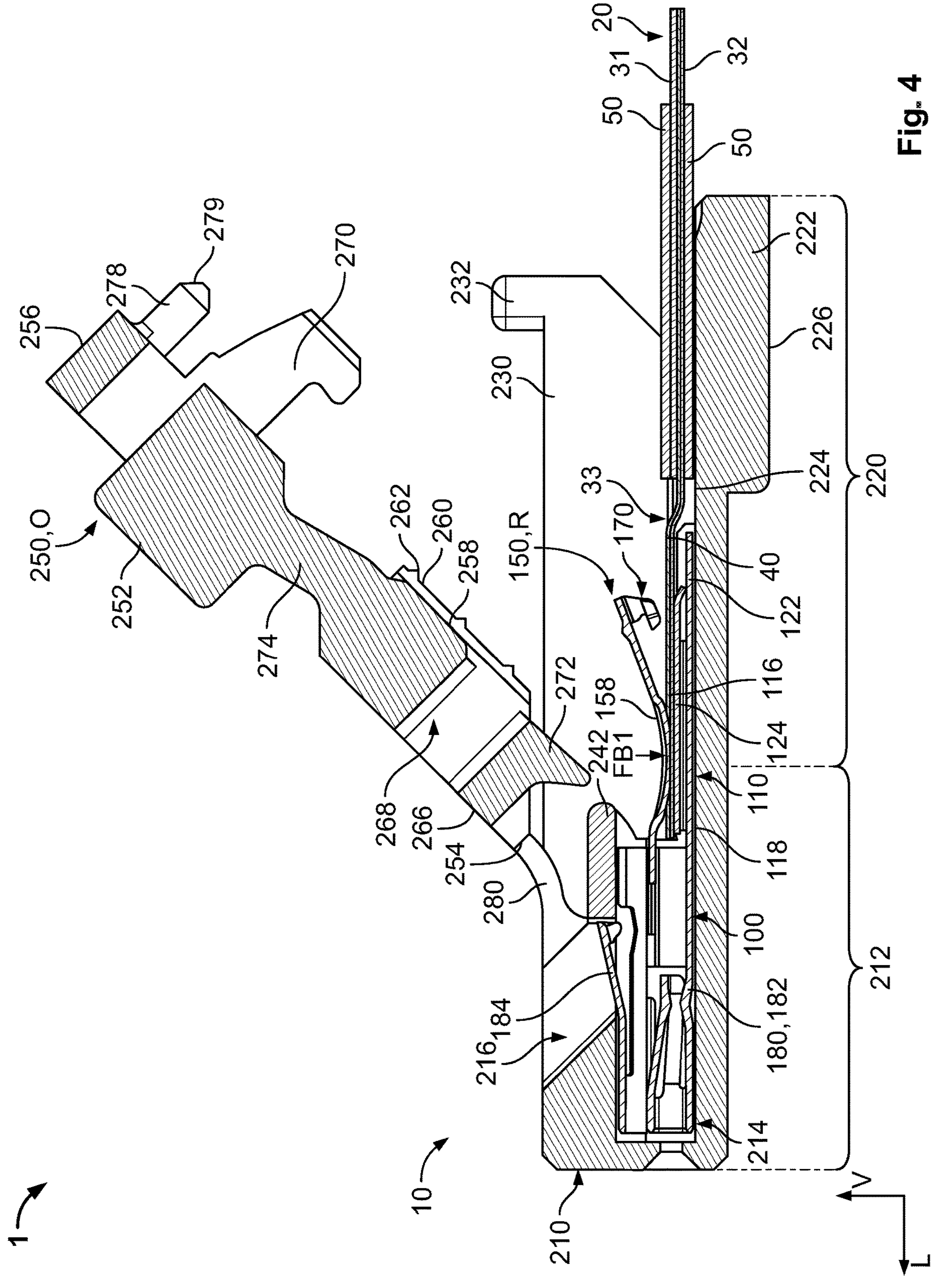
FIG. 4 is a sectional side view of a connector assembly including the connector with a cover of a housing of the connector in an open position.
Figure 7:
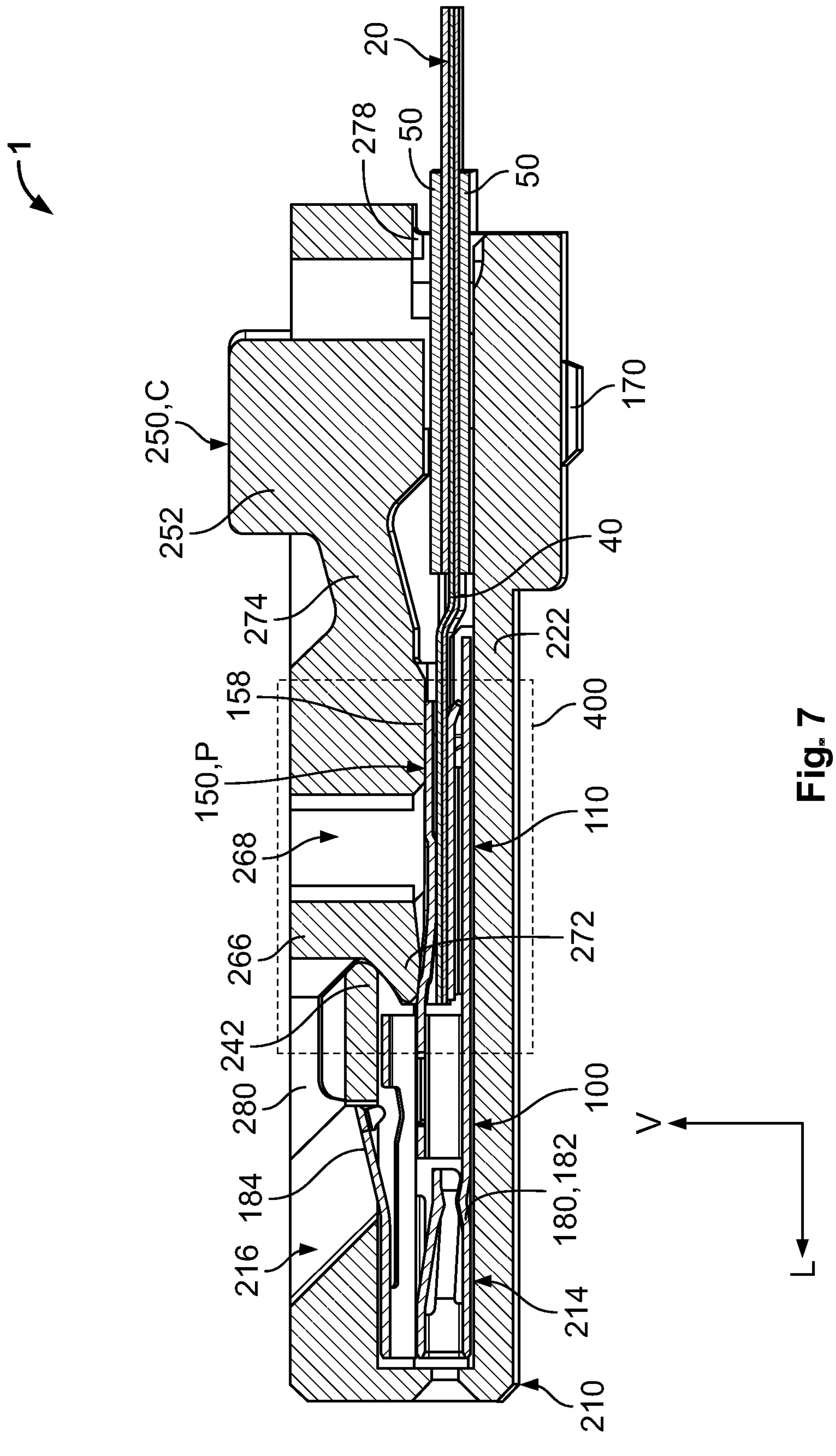
FIG. 7 is a sectional side view of the connector assembly with the cover in a closed position.
Figure 9:
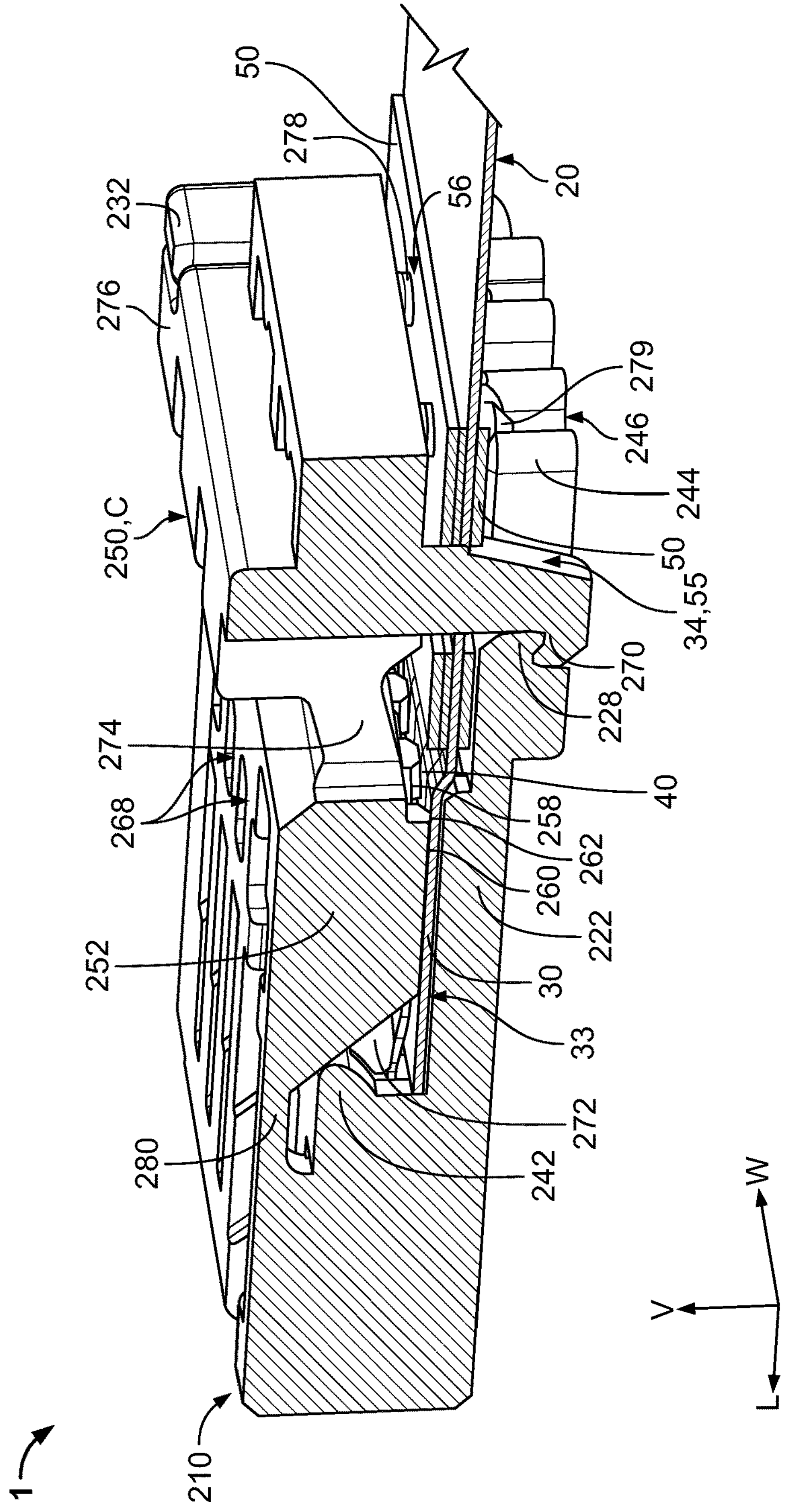
FIG. 9 is a sectional perspective view of the connector assembly with the cover in the closed position.

The housing 200, as shown in FIGS. 1, 4, 7, and 9, has a base 210 and a cover 250 movable with respect to the base 210 between an open position O, shown in FIGS. 1 and 4, and a closed position C, shown in FIGS. 7 and 9.

In the embodiment shown in FIGS. 1, 4, 7, and 9, the base 210 is attached to the cover 250 by a hinge 280 and the cover 250 is rotatable about the hinge 280 between the open position O and the closed position C. In the shown embodiment, the base 210 and the cover 250 are monolithically formed in a single piece and the hinge 280 is a film hinge. In other embodiments, the base 210 and the cover 250 can be formed in separate pieces and can be attached at the hinge 280 and rotatable about the hinge 280, or the base 210 and the cover 250 can be entirely separate pieces without the hinge 280. The housing 200 is formed of an insulative material, such as a plastic.

The base 210, as shown in FIG. 4, has a closed section 212 and an open section 220 extending from the closed section 212 along the longitudinal direction L. The closed section 212 encloses a receiving passageway 214 extending through the closed section 212 along the longitudinal direction L. A spring latch passageway 216 extends through the closed section 212 in the vertical direction V and communicates with the receiving passageway 214.

The open section 220, as shown in FIGS. 1 and 4, has a bottom wall 222 and a pair of sidewalls 230 extending from the bottom wall 222 in the vertical direction V. The bottom wall 222 and the sidewalls 230 define an interior receiving space 240 in the open section 220. The bottom wall 222 has an interior surface 224 and an exterior surface 226 opposite the interior surface 224 in the vertical direction V. As shown in FIG. 9, the bottom wall 222 has a catch 228 at an end of the bottom wall 222 in the longitudinal direction L. The catch 228 protrudes from the bottom wall 222 in the longitudinal direction L and in the vertical direction V.

As shown in FIGS. 1 and 4, each of the sidewalls 230 has a positioning tab 232 positioned at an end of the sidewall 230 in the longitudinal direction L and extending from the sidewall 230 in the vertical direction V.

The base 210, as shown in FIG. 4, has a base wedge 242 extending from the closed section 212 along the longitudinal direction L. In the shown embodiment, the base wedge 242 has an approximately triangular shape sloping toward the receiving passageway 214.

As shown in FIG. 1, the base 210 has a plurality of retention arms 244 extending along the longitudinal direction L. The retention arms 244 extend from an end of the open section 220 opposite the closed section 212. Each of the retention arms 244 has a retention recess 246 at an end of the retention arm 244.

The cover 250, as shown in FIGS. 1 and 4, has a main body 252 with a first end 254 and an opposite second end 256. The first end 254 of the main body 252 is attached to the hinge 280 in the shown embodiment. The main body 252 has a plurality of pressing surfaces 258 facing the base 210 in the open position O and an exterior surface 266 opposite the pressing surfaces 258.

As shown in FIG. 1, on a side of the main body 252 facing the base 210 in the open position O, the main body 252 has the plurality of pressing surfaces 258 and a plurality of separating surfaces 260 alternating with the pressing surfaces 258 in the width direction W. The separating surfaces 260 extend from the main body 252 beyond the pressing surfaces 258, as shown in FIGS. 1 and 4. In the shown embodiment, each of the separating surfaces 260 has a plurality of ribs 262 disposed on and projecting from the separating surface 260. Each of the separating surfaces 260 has three ribs 262 in the shown embodiment; in other embodiments, the separating surfaces 260 could each have one rib 262, two ribs 262, or more than three ribs 262, or the ribs 262 could be omitted from the separating surfaces 260.

As shown in FIGS. 1 and 4, the cover 250 has a plurality of windows 268 extending through the cover 250 from the pressing surface 258 to the exterior surface 266. The windows 268 alternate with the separating surfaces 260 along a width direction W perpendicular to the longitudinal direction L and the vertical direction V.

The cover 250, as shown in FIGS. 1 and 4, has a plurality of latches 270 extending from the main body 252 at the second end 256 of the main body 252. The embodiment shown in FIG. 1 has five latches 270 distributed along the main body 252 in the width direction W. In other embodiments, the number of latches 270 can be any other number of latches 270, including one latch 270.

The cover 250, as shown in FIGS. 1 and 4, has a plurality of cover wedges 272 positioned at the first end 254 of the main body 252. The cover wedges 272 extend from the main body 252 in the longitudinal direction L and the vertical direction V and, in the shown embodiment, have an approximately triangular shape. The number of cover wedges 272 could differ from the number in the embodiment shown in FIG. 1, provided that the number of cover wedges 272 corresponds to the number of base wedges 242.

The main body 252 of the cover 250, as shown in FIGS. 1 and 4, has a latch beam 274 disposed between the latches 270 and the windows 268. The latch beam 274 is monolithically formed in a single piece with the cover 250 but is resiliently flexible, allowing some deflection of the latch 270 with respect to the first end 254 of the main body 252.

The cover 250, as shown in FIG. 1, has a pair of flanges 276 extending from the second end 256 of the main body 252 in the width direction W, and has a plurality of retention pegs 278 extending from the second end 256 of the main body 252. Each of the retention pegs 278, in the shown embodiment, is an approximately cylindrical member with a pointed end 279 opposite the main body 252. The number of retention pegs 278 could differ from the number in the shown embodiment, provided that the number of retention pegs 278 corresponds to the number of retention recesses 246. In other embodiments, an exterior shape of the retention pegs 278 could differ from the cylindrical shape of the shown embodiment, provided that the shape of the retention pegs 278 corresponds to the shape of the retention recesses 246.

Figure 5:
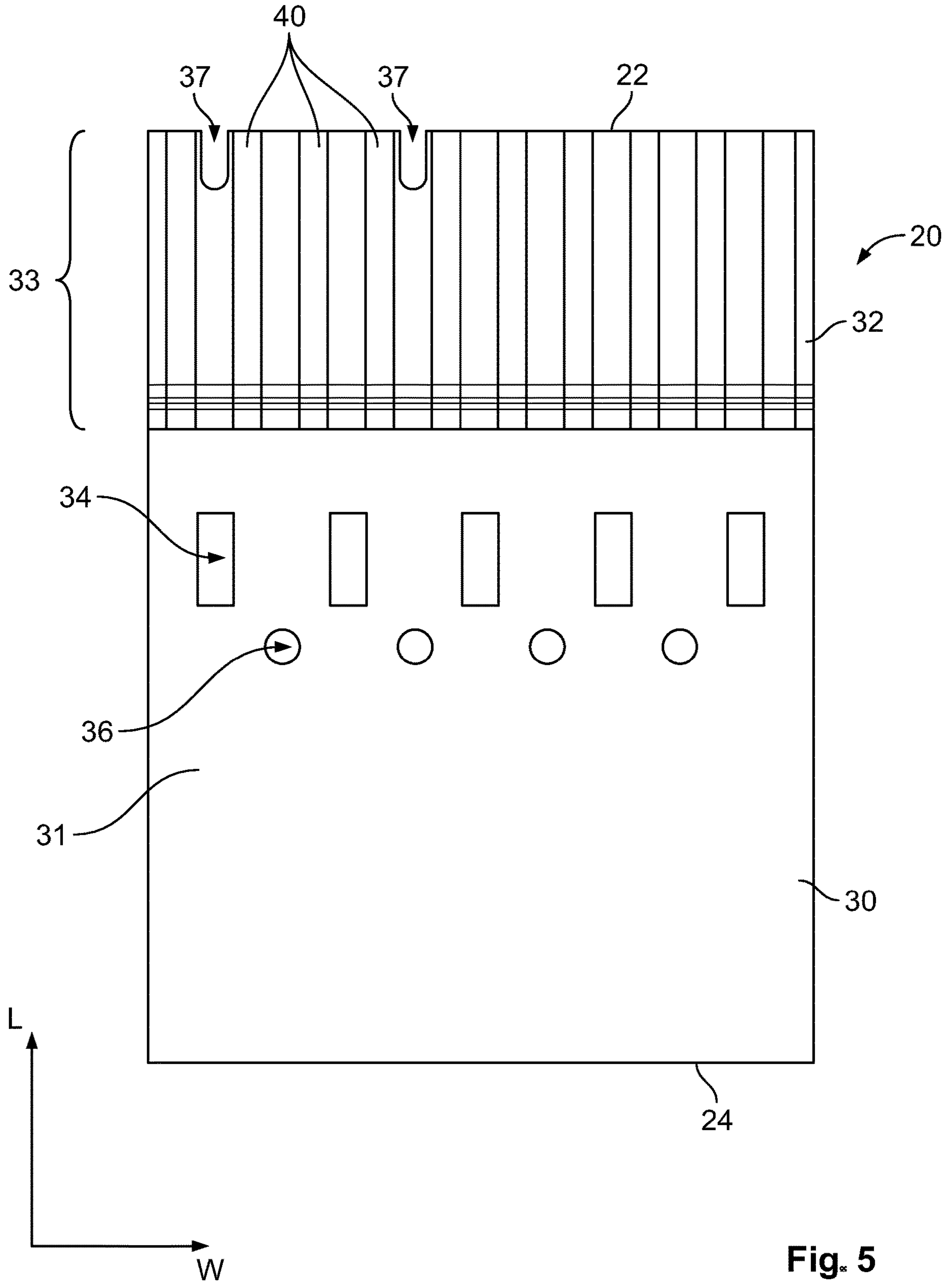
FIG. 5 is a plan view of a flat flexible cable according to an embodiment.

The FFC 20 that is connected to the connector 10 to form the connector assembly 1 is shown in FIG. 5. The FFC 20 extends from a first end 22 to a second end 24 along the longitudinal direction L. The FFC 20 includes an insulation material 30 and a plurality of flat conductors 40 embedded in the insulation material 30. In an embodiment, the flat conductors 40 are each a metallic foil, such as a copper foil, by way of example only, patterned in any desirable configuration. In another embodiment, the flat conductors 40 could each be formed of an aluminum material. The insulation material 30, such as a polymer insulation material, may be applied to either or both sides of the flat conductors 40 via an adhesive material or extruded directly over the flat conductors 40. The flat conductors 40 may also be referred to as conductors 40 herein.

The insulation material 30 has an upper side 31 and a lower side 32 opposite the upper side 31 in the vertical direction V, as shown in FIGS. 4 and 5. The conductors 40 are embedded in the insulation material 30 between the upper side 31 and the lower side 32. The FFC 20, in the shown embodiment, has a stripped section 33 at the first end 22 in which the upper side 31 of the insulation material 30 is removed to expose a side of the conductors 40.

As shown in the embodiment of FIG. 5, the FFC 20 has a plurality of latch openings 34 and a plurality of a plurality of peg openings 36 extending through the insulation material 30. The latch openings 34 and the peg openings 36 are positioned between the conductors 40 and do not expose the conductors 40. In the shown embodiment, the FFC 20 has five first latch openings 34 and four peg openings 36. In other embodiments, the FFC 20 could have any number of latch openings 34 and peg openings 36, provided that the number of latch openings 34 corresponds to the number of latches 270 and the number of peg openings 36 corresponds to the number of retention pegs 278.

In the embodiment shown in FIG. 5, the FFC 20 has a pair of key slots 37 extending into the first end 22 of the FFC 20 in the stripped section 33. The positioning and number of the key slots 37 in the shown embodiment are merely exemplary, and any number of key slots 37 can be positioned in any arrangement at the first end 22 of the FFC 20 in other embodiments.

Figure 6:
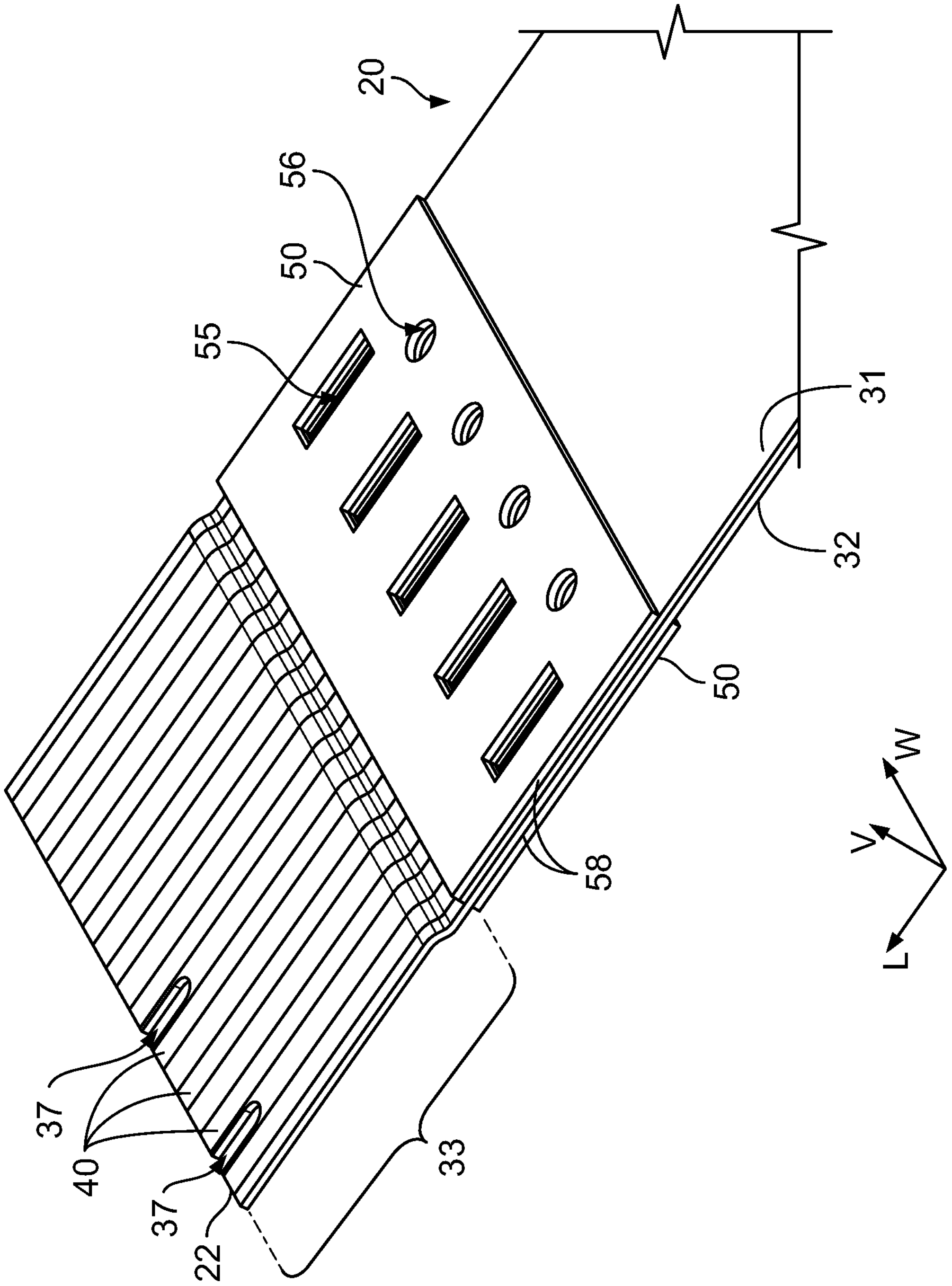
FIG. 6 is a perspective view of the flat flexible cable with retention plates.

As shown in FIG. 6, a pair of retention plates 50 are attached to the FFC 20. Each of the retention plates 50 is a resiliently flexible member that is monolithically formed in a single piece from an insulative plastic material, such as mylar. Each of the retention plates 50 has a plurality of latch openings 55 and a plurality of retention openings 56 extending through the retention plate 50 along the vertical direction V. The number of latch openings 55 in the retention plate 50 corresponds to the number of latch openings 34 in the FFC 20, and the number of retention openings 56 in the retention plate 50 corresponds to the number of peg openings 36 in the FFC 20.

As shown in the embodiment of FIG. 6, one of the retention plates 50 is disposed on the upper side 31 of the FFC 20 and the other of the retention plates 50 is disposed on the lower side 32 of the FFC 20. The latch openings 55 are aligned with the latch openings 34 along the vertical direction V, and the retention openings 56 are aligned with the peg openings 36 along the vertical direction V. The openings 55, 56, in the retention plate 50 may be the same size or larger than the corresponding openings 34, 36 in the FFC 20.

In an embodiment, the retention plates 50 are attached to the FFC 20 by an adhesive 58, as shown in FIG. 6. The adhesive 58 may be a same type of adhesive as is used to attach the upper side 31 and the lower side 32 of the insulation material 30 to each other around the conductors 40 of the FFC 20. In another embodiment, the adhesive 58 is not used, and the retention plate 50 is disposed on the upper side 31 and the lower side 32 and retained by the elements of the housing 200 as described below.

In other embodiments, only one retention plate 50 is disposed on either of the upper side 31 or the lower side 32 of the FFC 20 and aligned as described herein, and the other retention plate 50 can be omitted. In another embodiment, both retention plates 50 can be omitted.

The assembly of the connector 1 will now be described in greater detail primarily with reference to FIGS. 1, 4, and 7-11.

The spring clips 100 are inserted into the housing 200 with the cover 250 in the open position O, as shown in FIG. 1. The spring clips 100 are each inserted into one of the receiving passageways 214 shown in FIG. 4 along the longitudinal direction L. The insertion of the spring clips 100 into the housing 200 forms the connector 10. The connector 10 can be transported with the spring clips 100 preloaded in the housing 200 to protect the spring clips 100 during shipping and handling.

When the spring clip 100 is inserted, the clip latch 184 contacts the housing 200 during insertion along the longitudinal direction L. The clip latch 184 is deflected by the housing 200 until the clip latch 184 resiliently deflects away from the connection section 180 and into the spring latch passageway 216. The clip latch 184 engages the housing 200 in the spring latch passageway 216 to secure the spring latch 100 in the receiving passageway 214, as shown in FIG. 4.

With the second beam 150 of the spring clip 100 in a relaxed position R distal from the first beam 110, the FFC 20 is inserted into the interior receiving space 240 of the housing 200 and into the spring clip 100 between the first beam 110 and the second beam 150, as shown in FIG. 4. The contact bend 158 abuts against a conductor 40 exposed in the stripped section 33 when the FFC 20 is fully inserted. In an embodiment, insertion of the FFC 20 deflects the second beam 150 away from the first beam 110 and toward the cover 250 that remains in the open position O. The lower side 32 of the insulation material 30 is positioned along the contact surface 116 of the first beam 110. The key slots 37 ensure that the FFC 20 has been inserted into the connector 10 in the proper orientation.

With the FFC 20 inserted in the position shown in FIG. 4, with the cover 250 in the open position O and the second beam 150 in the relaxed position R, the conductor 40 is electrically connected to the spring clip 100 and the contact bend 158 applies a first bend contact force FB1 on the FFC 20, pressing against the conductor 40 toward the contact surface 116 of the first beam 110. The spring latch 170 extends toward the FFC 20 but does not abut the FFC 20 in the position shown in FIG. 4.

The cover 250 is then moved from the open position O shown in FIG. 4 to the closed position C shown in FIGS. 7 and 9. The cover 250 exposes the open section 220 in the open position O and encloses the open section 220 in the closed position C. In the shown embodiment, the cover 250 pivots about the hinge 280 from the open position O to the closed position C.

As the cover 250 begins to move toward the closed position C, from the position shown in FIG. 4 to the position shown in FIGS. 7 and 9, the cover wedge 272 abuts the base wedge 242 and moves along the base wedge 242 as the cover 250 pivots about the hinge 280. In the closed position C, the cover wedge 272 can abut the connection section 180 and ensure the spring clip 100 is seated in the receiving passageway 214, securing the spring clip 100 in the receiving passageway 214. Each of the latches 270 enters and moves through one of the latch openings 34 of the FFC 20 and one of the latch openings 55 of each of the retention plates 50 as the cover 250 moves toward the closed position C, helping to retain the FFC 20 in the connector 10.

As the cover 250 moves from the open position O shown in FIG. 4 to the closed position C shown in FIGS. 7 and 9-11, the pressing surface 258 contacts the second beam 150 and deflects the second beam 150 toward the first beam 110 from the relaxed position R into a compressed position P proximal to the first beam 110. In an embodiment, the pressing surface 158 contacts the bead 162 of the second beam 150 as the cover 250 moves toward the closed position C.

As the second beam 150 moves toward the first beam 110, the contact bend 158 presses against the conductor 40 and, resisted by a stiffness of the folded structure 124 in the contact section 120, begins to flatten as the spring latch 170 moves toward the first beam 110. The contact bend 158 continues to flatten until the spring latch 170 reaches the latch section 130 of the first beam 110. The sharp free ends 174 of the latch arms 172 pierce the insulation material 30 of the FFC 20 on opposite sides of the conductor 40 disposed in the spring clip 100 and the latch arms 172 extend through the insulation material 30. As the spring latch 170 moves toward the latch section 130, the latch tips 176 engage the sloped surface 136 of the folded extension 134 and are resiliently deflected away from one another in the width direction W as they move along the sloped surface 136. When the spring latch 170 reaches the compressed position P shown in FIG. 7 and in the detail 400 of FIG. 7 shown in FIG. 8, the latch tips 176 elastically return and engage the folded extension 134 in the latch section 130 to secure the second beam 150 in the compressed position P. The latch height 132, as shown in FIG. 8, provides sufficient space for the latch arms 172 to move beyond the folded extension 134 in the vertical direction V and engage the first beam 110 without contacting the bottom wall 222.

Figure 8:
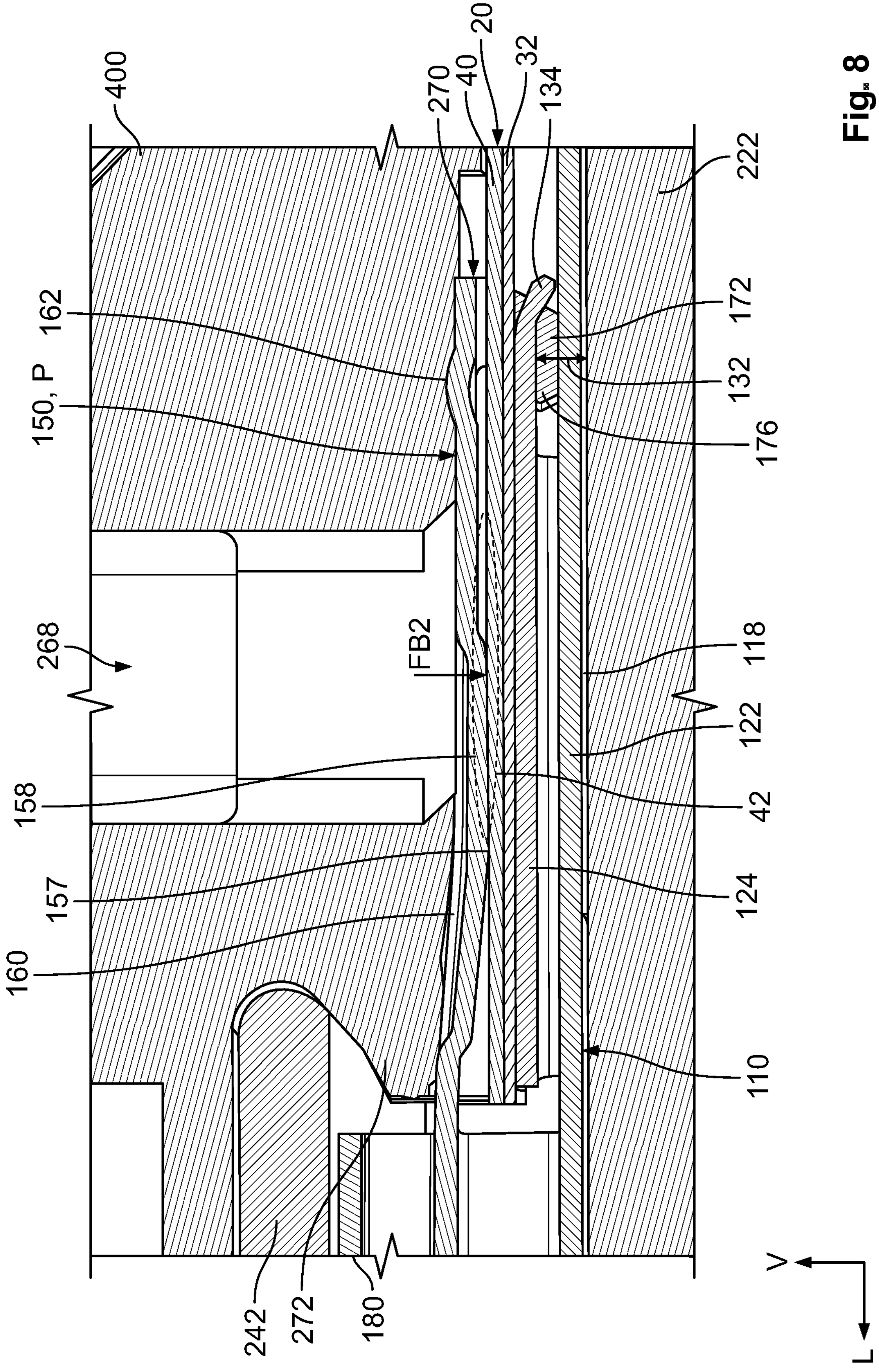
FIG. 8 is a detail sectional side view of a portion of FIG. 7.

In an embodiment, the radius of curvature 159 of the contact bend 158 shown in FIG. 3 is designed such that, when the contact bend 158 is flattened as shown in FIG. 8 in the compressed position P of the second beam 150, the interior surface 157 of the second beam 150 has a maximum contact area with the conductor 40 without going into yield.

The second beam 150 remains in an elastic state when flattened against the conductor 40 in the compressed position P due to the radius of curvature 159, avoiding permanently setting the flattening condition.

In the compressed position P of the second beam 150 and the closed position C of the cover 250, as shown in FIGS. 8 and 9, the contact bend 158 applies a second bend contact force FB2 against the conductor 40 and toward the first beam 110. The stiffness provided by the folded structure 124 and the flexure of the contact bend 158 results in a second bend contact force FB2 that is higher than the first bend contact force FB1 in the relaxed position R. In an embodiment, the bend embossment 160 in the contact bend 158 further increases the second bend contact force FB2.

The increased second bend contact force FB2 in the compressed position P results in better contact of the conductor 40 with the contact spring clip 100 that is more robust over time and more resistant to vibration. The securing of the second beam 150 in the compressed position P by the engagement of the spring latch 170 with the first beam 110 maintains the second bend contact force FB2 through elements of the spring clip 100 itself, without relying on plastic components of the housing 200 to maintain the contact force over time. Further, the electrical connection between the conductor 40 and the spring clip 100 is formed and maintained without the need to crimp terminals to the FFC 20.

In an embodiment, the pressing surface 258 moves the second beam 150 into the compressed position P before the latch 270 is fully engaged with the catch 228 due to the resilient flexure of the latch beam 274. As the cover 250 moves into the closed position C shown in FIG. 9, the latch 270, under an elastic restoration of the latch beam 274, engages the catch 228 to secure the cover 250 with respect to the base 210.

The retention pegs 278 each move through one of the peg openings 36 of the FFC 20 and one of the retention openings 56 of the retention plates 50 and are positioned in the retention recess 246 of one of the retention arms 244 in the closed position C, as shown in FIG. 9. In another embodiment, the FFC 20 does not have the peg openings 36, and the pointed ends 279 of the retention pegs 278 pierce the insulation material 30 between the conductors 40 as the cover 250 moves into the closed position C. The retention pegs 278 retain the FFC 20 while the positioning of the pegs 278 in the retention recesses 246 allows for a visual confirmation that the cover 250 has reached the closed position C.

Figure 10:
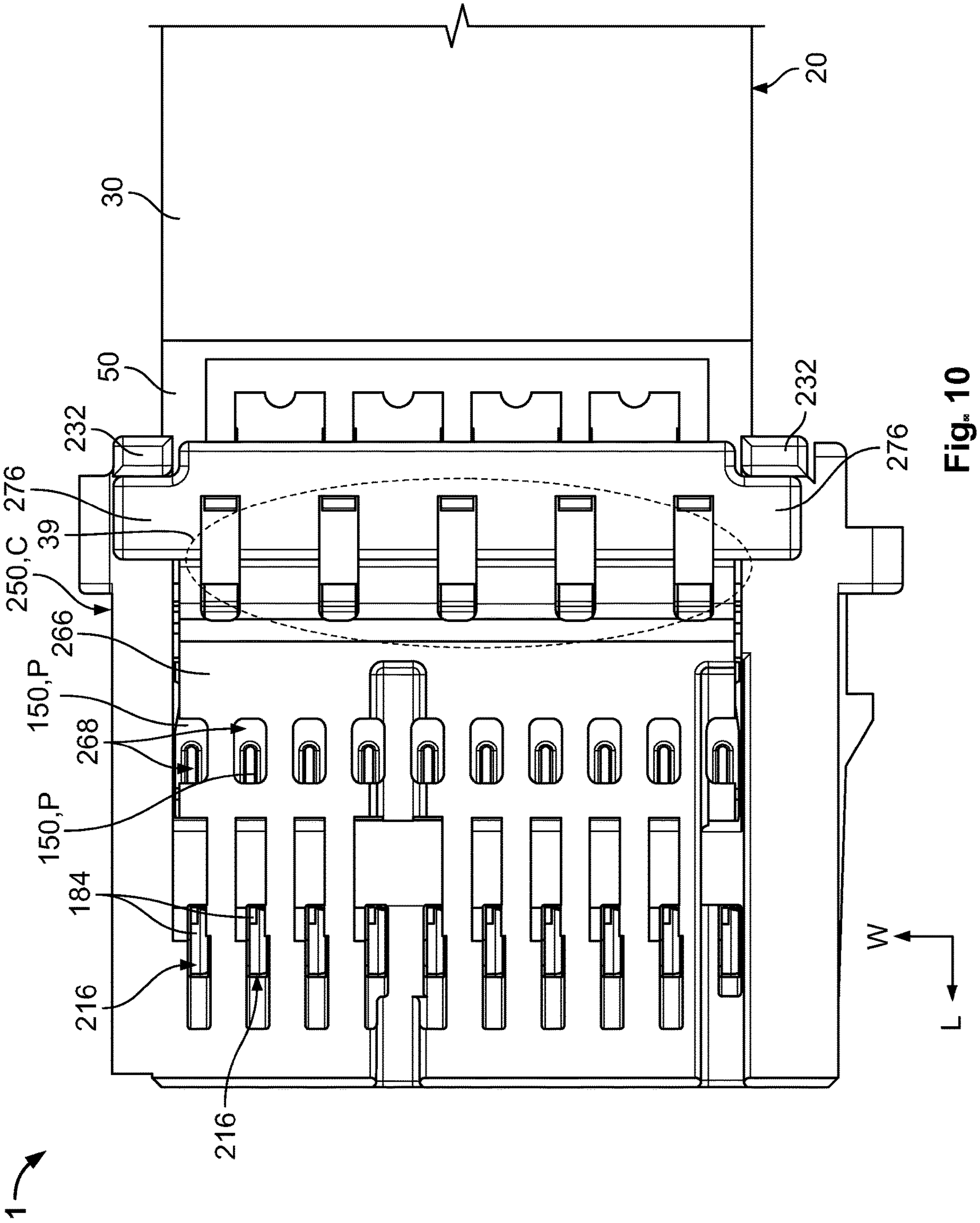
FIG. 10 is a plan view of the connector assembly with the cover in the closed position.

Additionally, in the closed position C, the flanges 276 each abut one of the positioning tabs 232 along the longitudinal direction L, as shown in FIGS. 9 and 10. The abutment of the flanges 276 with the positioning tabs 232 further limits the movement of the cover 250 out of the closed position C along the longitudinal direction L.

The restrictions on the movement of the cover 250 from the closed position C described herein help to retain the spring clips 100 in electrical contact with the conductors 40 of the FFC 20 as described below. The latching and retention of the components of the housing 200 in the closed position C described above mechanically retain the FFC 20 and support the compressed position P of the spring clips 100.

Figure 11:
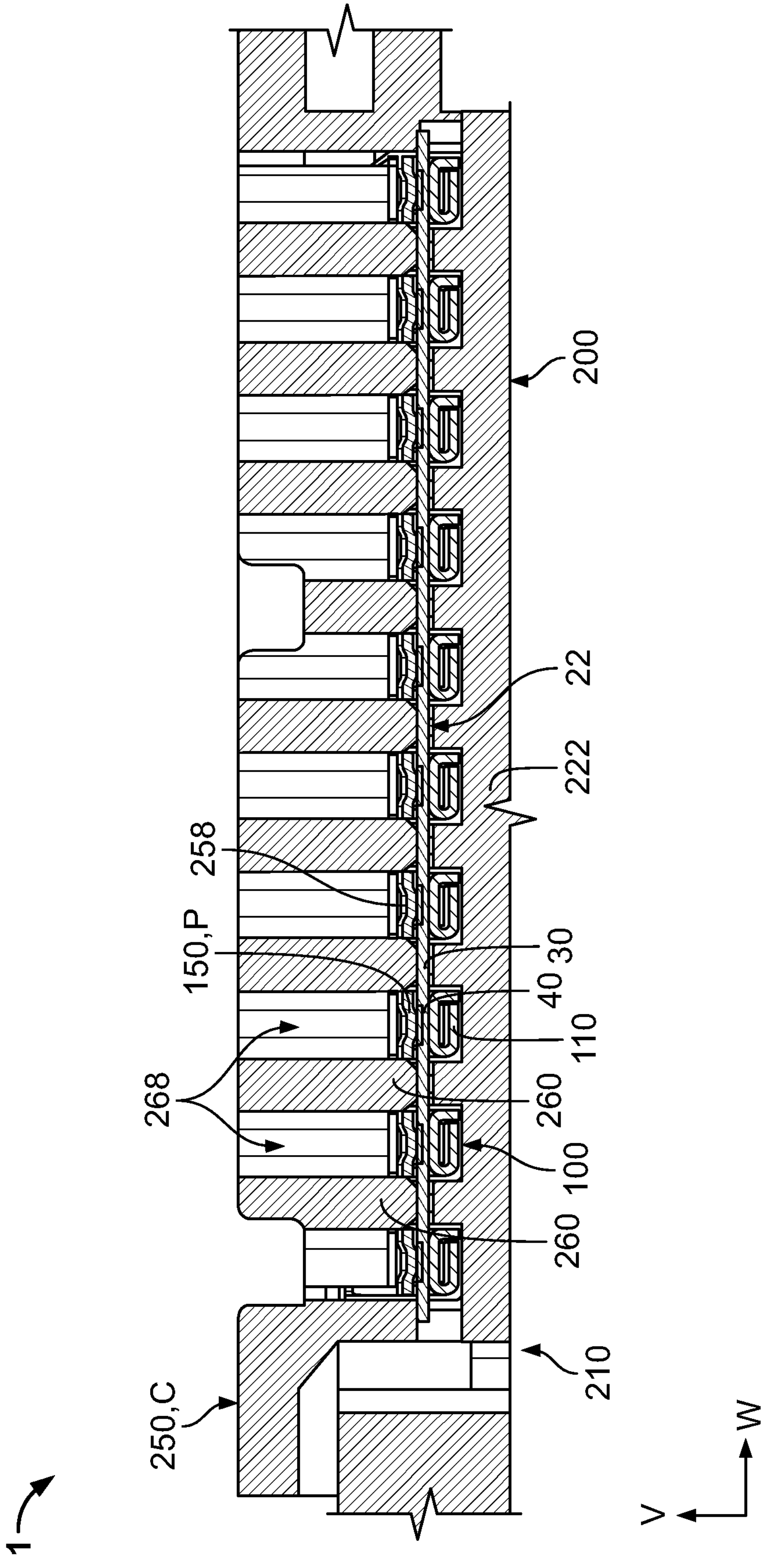
FIG. 11 is a sectional end view of the connector assembly with the cover in the closed position.

In the closed position C, as shown in FIGS. 9 and 11, the separating surfaces 260 abut the insulation material 30 of the FFC 20 in the stripped section 33. Each of the separating surfaces 260 abuts the insulation material 30 between two of the conductors 40. The ribs 262 of the separating surfaces 260 press the insulation material 30 in the vertical direction V against the bottom wall 222 of the housing 200. The abutment of the separating surfaces 260 with the insulation material 30 isolates the plurality of windows 268 shown in FIGS. 9-11 from one another.

As shown in FIGS. 8, 10, and 11, in the closed position C, each of the windows 268 is aligned in the vertical direction V with one conductor 40 of the FFC 20 electrically connected to one spring clip 100, the conductor 40 held between the first beam 110 and second beam 150 of the spring clip 100, with the second beam 150 in the compressed position P. The windows 268 each expose the contact bend 158 of the second beam 150 to an area outside of the connector 10 and outside of the connector assembly 1.

In an embodiment, the second beams 150 are each welded to one of the conductors 40 through a corresponding one of the windows 268, for example by laser welding. The welding forms a conductive weld joint 42 between the second beam 150 and the conductor 40 through the window 268, as shown in FIG. 8. The conductive weld joint 42 maintains the electrical connection between the second beam 150 and the conductor 40 while further mechanically securing the connection of the spring clips 100 and the FFC 20.

As shown in FIGS. 8 and 10, the windows 268 and the flattening of the second beams 150 in the compressed position P provides a long, flat area for welding the second beams 150 to the conductors 40 along the longitudinal direction L. The separating surfaces 160 isolate the spring clips 100 from one another, as shown in FIG. 11 and described above, containing any splatter that may occur during welding to one window 268, isolating one circuit from another by avoiding forming unintended electrical connections between adjacent spring clips 100 and conductors 40. The second bend contact force FB2 applied between the second beam 150 and the conductor 40 in the compressed position P eliminates weld gaps, further increasing long term stability of the connection between the spring clips 100 and the FFC 20.

In another embodiment, the welding is not performed through the windows 268 and no conductive weld joint 42 is formed between the second beams 150 and the conductors 40. In this embodiment, the second bend contact force FB2 is sufficient to maintain both the electrical connection between the second beams 150 and the conductors 40 and the mechanical connection between the spring clips 100 and the FFC 20.

In an embodiment, in the closed position C of the cover 250 shown for example in FIG. 10, a plastic welding is performed to connect the insulation material 30 of the FFC 20 to the housing 200 by a plastic weld joint 39, further mechanically connecting the FFC 20 to the housing 200. In an embodiment, the plastic weld joint 39 can be formed between the insulation material 30 and the housing 200 in the region indicated in FIG. 10; for example through openings in the housing 200 adjacent to the windows 268 along the longitudinal direction L. In other embodiments, the plastic weld joint 39 could be formed at any area of the connector assembly 1 at which the insulation material 30 abuts the housing 200.

Figure 12:
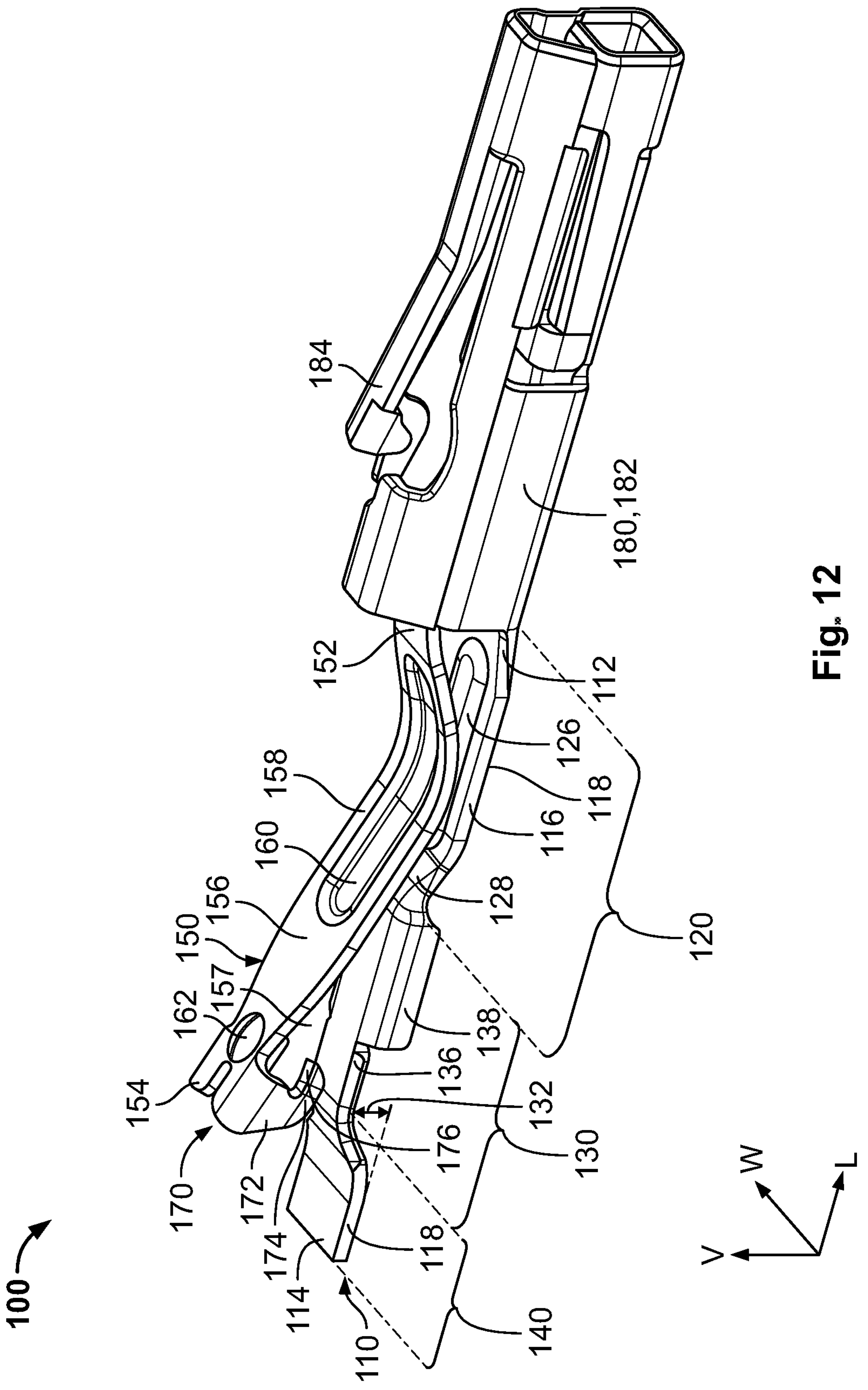
FIG. 12 is a perspective view of a spring clip according to another embodiment.

A spring clip 100 according to another embodiment is shown in FIG. 12. Like reference numbers refer to like elements in comparison with the spring clip 100 shown in FIG. 2, and primarily the differences of the embodiment shown in FIG. 12 will be described in detail herein.

The spring clip 100 of the embodiment shown in FIG. 12 differs only in the structure of the first beam 110. In the contact section 120, instead of the base beam 122 and the folded structure 124, the first beam 110 forms the bottom surface 118 and the contact surface 116 on a side opposite the bottom surface 118 in the vertical direction V. In the shown embodiment, the first beam 110 has a contact embossment 126 in the contact section 120.

The first beam 110, as shown in FIG. 12, has a ramp 128 at a transition between the contact section 120 and the latch section 130 along the longitudinal direction L. The ramp 128 raises the bottom surface 118 of the first beam 110 to the latch height 132 in the latch section 130, positioning the latch section 130 above the contact section 120 in the vertical direction V. To support the first beam 110 at the latch height 132 in the latch section 130, the first beam 110 has a pair of support legs 138 monolithically formed with the first beam 110 and bent from opposite sides of the first beam 110 in the width direction W. The support legs 138 extend in the vertical direction V from the first beam 110 by the distance of the latch height 132. As shown in FIG. 12, the first beam 110 has the sloped surface 136 in the latch section 130 adjacent to the support legs 138 along the longitudinal direction L.

As shown in FIG. 12, the first beam 110 is bent back down from the latch section 130 to form the end section 140, with the bottom surface 118 in the end section 140 coplanar with the bottom surface 118 in the contact section 120.

The functions of the spring clip 100 in the embodiment shown in FIG. 12 in the connector 10 and the connector assembly 1 are the same as for the spring clip 100 in the embodiment shown in FIG. 2 and described above. The second beam 150 is deflected toward the first beam 110 and the spring latch 170 latches with the latch section 130. In the embodiment shown in FIG. 12, the contact embossment 126 contributes to the increase of the second bend contact force FB2 in the compressed position P of the second beam 150, while the ramp 128 provides overstress protection by preventing over-deflection of the second beam 150 as it moves into the compressed position P.

What is claimed is:

1. A spring clip, comprising:

a first beam, including:

a contact section having a base beam and a folded structure that extends from the base beam and is folded over the base beam, the folded structure forms a contact surface in the contact section; and a latch section extending from the contact section along a longitudinal direction, wherein a folded extension extends from the folded structure into the latch section, the folded extension is positioned above the base beam in a vertical direction perpendicular to the longitudinal direction; and a second beam connected to the first beam and resiliently deflectable toward the first beam from a relaxed position distal from the first beam to a compressed position proximal to the first beam, the second beam has a spring latch disposed at an end of the second beam and extending toward the first beam, the spring latch engages with the folded extension of the first beam in the latch section in the compressed position, the contact surface in the contact section of the folded structure faces the second beam.

2. The spring clip of claim 1, wherein the latch section is positioned above the contact section in a vertical direction perpendicular to the longitudinal direction, the latch section has a pair of support legs extending in the vertical direction.

3. The spring clip of claim 1, wherein the second beam has a contact bend extending toward the first beam and aligned with the contact section, the spring latch engaging the folded structure of the first beam maintains a contact force of the contact bend toward the contact section in the compressed position.

4. The spring clip of claim 1, wherein the spring latch has a pair of latch arms extending from opposite sides of the second beam, each of the latch arms has a latch tip angled toward the opposite one of the latch arms.

5. The spring clip of claim 4, wherein the latch tip of each of the latch arms resiliently deflects to engage the first beam in the compressed position.

6. The spring clip of claim 4, wherein each of the latch arms has a sharp free end opposite the second beam.

7. A connector for a flat flexible cable, comprising:

a housing having a base and a cover, the base has a closed section with a plurality of receiving passageways and an open section extending from the closed section, the cover is movable with respect to the base between an open position exposing the open section and a closed position enclosing the open section, the cover has a main body with a pressing surface; and a plurality of spring clips disposed in the receiving passageways, each of the spring clips having:

a first beam including a contact section having a base beam and a folded structure that extends from the base beam and is folded over the base beam, the folded structure forms a contact surface in the contact section, and a latch section extending from the contact section along a longitudinal direction; and a second beam connected to the first beam, the pressing surface contacts the second beam as the cover moves from the open position to the closed position and deflects the second beam toward the first beam into a compressed position, the second beam including:

a spring latch extending toward the first beam, the spring latch engages the first beam in the compressed position, the cover includes a plurality of windows extending through the cover from the pressing surface to an exterior surface of the cover opposite the pressing surface, each window exposing the second beam of a respective one of the plurality of spring clips to an area outside the connector in the closed position, the second beams exposed in areas of abutting contact between respective ones of the first beams and the second beams; and a contact bend extending toward the first beam and aligned with the contact section, the spring latch engaging the folded structure of the first beam maintains a contact force of the contact bend toward the contact section in the compressed position.

8. A connector assembly, comprising:

a flat flexible cable having an insulation material and a conductor embedded in the insulation material, the conductor is exposed through a portion of the insulation material;

a connector including a housing and a spring clip disposed in the housing, the spring clip has a first beam and a second beam connected to the first beam, the first beam providing a contact section with a base beam and a folded structure that extends from the base beam and is folded over the base beam, the folded structure forms a contact surface in the contact section; the flat flexible cable is disposed between the first beam and the second beam, the second beam is resiliently deflectable toward the first beam into a compressed position in which the conductor is electrically connected to the spring clip, the second beam has a spring latch engaging the folded structure of the first beam to maintain a contact force in the compressed position, the housing has a base and a cover, the cover is attached to the base by a hinge, such that the cover is rotatable about the hinge and is movable with respect to the base between an open position exposing an open section of the base and a closed position enclosing the open section; and a retention plate disposed on at least one of an upper side and a lower side of the flat flexible cable, the cover of the housing extends through the retention plate in a direction transverse to a longitudinal direction of the flat flexible cable in the closed position.

9. The connector assembly of claim 8, wherein the spring latch has a latch arm extending through the insulation material in the compressed position.

10. The connector assembly of claim 8, wherein the cover has a pressing surface contacting the second beam as the cover moves from the open position to the closed position and moving the second beam into the compressed position.

11. The connector assembly of claim 10, wherein the cover has a window extending through the cover from the pressing surface to an exterior surface of the cover opposite the pressing surface.

12. The connector assembly of claim 11, wherein a conductive weld joint is formed between the second beam and the conductor through the window.

13. The connector assembly of claim 10, wherein the cover has a separating surface adjacent to the pressing surface, the separating surface abutting the insulation material of the flat flexible cable in the closed position.

14. The connector assembly of claim 8, wherein the second beam is flattened against the conductor in the compressed position and remains in an elastic state.

15. The connector assembly of claim 8, wherein the retention plate is separate and discrete from the housing and is disposed directly on the upper side or the lower side of the flat flexible cable.

16. The spring clip of claim 1, wherein the spring clip is adapted to receive a conductor of a flat flexible cable between the contact section of the first beam and the second beam and in the compressed position.

17. The spring clip of claim 1, wherein the folded structure is arranged directly below the second beam in a vertical direction perpendicular to the longitudinal direction.

18. A spring clip, comprising:

a first beam, including:

a contact section having a base beam and a folded structure that extends from the base beam and is folded over the base beam, the folded structure forms a contact surface in the contact section; and a latch section extending from the contact section along a longitudinal direction, the latch section is positioned above the contact section in a vertical direction perpendicular to the longitudinal direction, the latch section has a pair of support legs extending in the vertical direction; and a second beam connected to the first beam and resiliently deflectable toward the first beam from a relaxed position distal from the first beam to a compressed position proximal to the first beam, the second beam has a spring latch disposed at an end of the second beam and extending toward the first beam, the spring latch engages the first beam in the latch section in the compressed position, the contact surface in the contact section of the folded structure faces the second beam.

* * * * *